United States Patent
Kohn

[19]

[11] Patent Number: 5,820,737
[45] Date of Patent: Oct. 13, 1998

[54] ANTI-FOULING LAMINATE MARINE STRUCTURES

[76] Inventor: Henri-Armand Kohn, 102 A. Furnace Dock Rd., Croton-on-Hudson, N.Y. 10520

[21] Appl. No.: 805,475

[22] Filed: Feb. 25, 1997

[51] Int. Cl.⁶ ............................................. C23F 13/00
[52] U.S. Cl. .................. 204/196; 114/67 R; 114/222; 204/197; 205/724; 205/730; 205/737; 205/739; 205/740
[58] Field of Search ................... 204/196, 197; 205/724, 730–740; 114/222, 67 R

[56] References Cited

U.S. PATENT DOCUMENTS

| | | | |
|---|---|---|---|
| 843,357 | 2/1907 | Partee et al. | 114/222 |
| 994,405 | 6/1911 | James | 114/222 |
| 2,435,986 | 2/1948 | Taylor | 114/222 |
| 3,298,892 | 1/1967 | Lippay | 428/53 |
| 3,325,037 | 6/1967 | Kohn et al. | 220/453 |
| 3,497,434 | 2/1970 | Littauer | 204/196 |
| 3,510,094 | 5/1970 | Clark | 114/67 R |
| 3,520,790 | 7/1970 | Araki et al. | 204/196 |
| 3,540,967 | 11/1970 | Shook et al. | 156/363 |
| 3,971,084 | 7/1976 | Spier | 114/67 R |
| 4,283,461 | 8/1981 | Wooden et al. | 114/222 |
| 4,375,199 | 3/1983 | Graeme-Barber et al. | 114/222 |
| 4,568,585 | 2/1986 | Kohn et al. | 428/48 |
| 4,767,512 | 8/1988 | Cowatch et al. | 204/196 |
| 4,869,016 | 9/1989 | Diprose et al. | 114/222 |
| 5,088,432 | 2/1992 | Usami et al. | 114/222 |
| 5,346,598 | 9/1994 | Riffe et al. | 205/735 |

*Primary Examiner*—T. Tung
*Attorney, Agent, or Firm*—Michael Ebert

[57] ABSTRACT

A marine structure submersible in seawater, such as a hull, which when electrically activated is then resistant to fouling by marine organisms. The hull is formed by a structural laminate having a core sandwiched between inner and outer skins. The outer skin which forms the exposed surface of the hull is coated with a metallic paint defining a cathodic electrode. The core is constituted by balsa wood or foam plastic modules attached to an open-mesh scrim that includes conductive fibers to create an electrical grid defining an anodic electrode that is embedded in the laminate. Impressed across the electrodes is a direct voltage to establish an electric field causing marine organisms which seek to foul the hull surface to migrate away from this surface. Alternatively, the cathodic electrode may be formed by an open-mesh scrim defining an electrical grid interposed between the core and the outer skin.

11 Claims, 2 Drawing Sheets

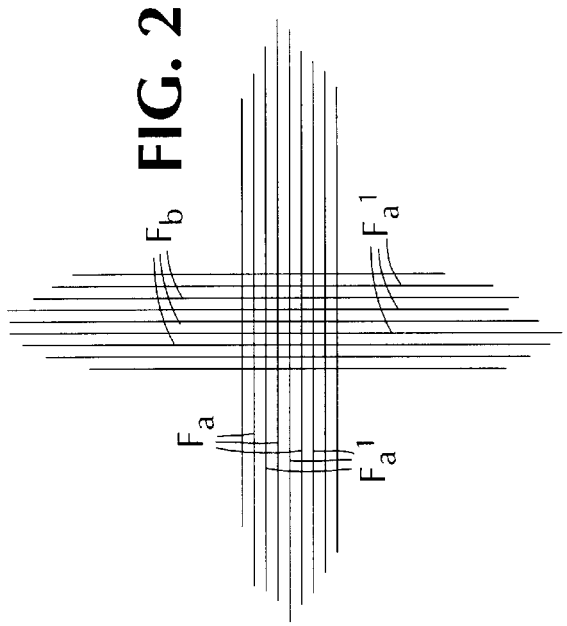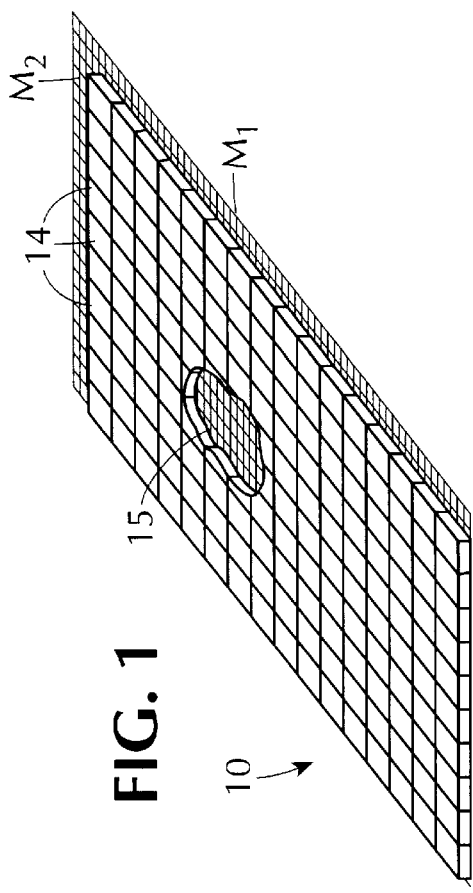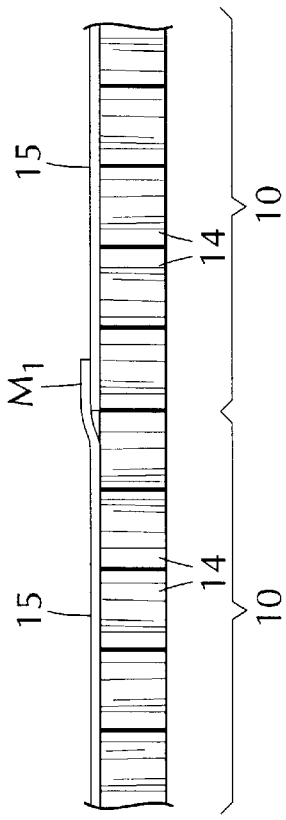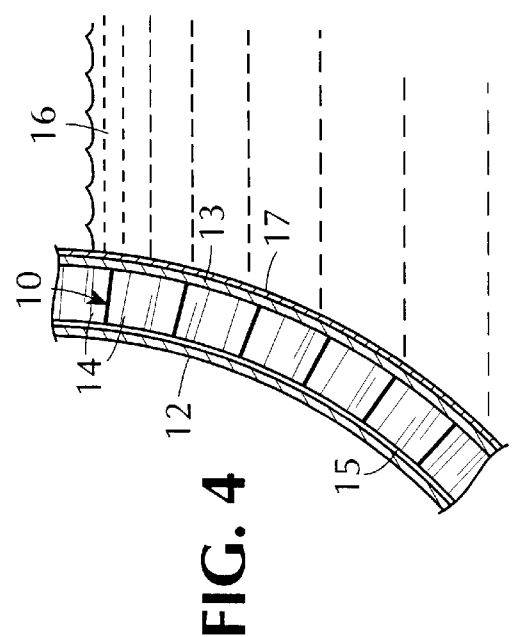

ANTI-FOULING LAMINATE MARINE STRUCTURES

BACKGROUND OF INVENTION

1. Field of Invention

This invention relates generally to the prevention of fouling of marine structures, and more particularly to a laminated marine structure, such as a boat hull submersible in sea water, which when electrically-activated is then rendered resistant to fouling by marine organisms.

2. Status of Prior Art

Structural sandwich laminates are produced by bonding thin facings or skins of high tensile strength to a light weight core material. The main function of the bonded core material in the laminate is to stabilize and stiffen the facings so that the major part of the load to which this laminate is subjected is borne by the skins.

It is known that laminates having a high strength-to-weight ratio can be realized by combining the superior properties of end-grain balsa wood with suitable facings. End-grain balsa has a uniformly high compressive strength as well as a high modulus of rigidity and elasticity. Such structural laminates having an end grain core are disclosed in the Kohn et al. U.S. Pat. No. 3,325,037 and in the Lippay U.S. Pat. No. 3,298,892.

In the case of boat hulls or other marine structures having single or double curvatures, or other complex contours, it is not possible to conform a solid balsa core to these contoured surfaces. In order to render the balsa core contourable, it is known to provide a contourable balsa wood blanket in which small, individual balsa wood blocks or modules are attached to an open-mesh fabric scrim whereby the blanket may readily be conformed to a curved surface for lamination thereto. Contourable core blankets are disclosed in the Shock et al. U.S. Pat. No. 3,540,967 and in Kohn et al. U.S. Pat. No. 4,568,585.

Contourable core balsa wood blankets are currently being marketed under the trademark "Contour Kore" by Baltek Corporation of Northvale, N.J. These blankets are useful in the construction of boats and larger vessels having reinforced plastic hulls in which the contourable balsa wood blanket is laminated between layers of fiberglass-reinforced resin. In the resultant structural laminate, the distribution of weight is favorable to high stability and buoyancy, and impart stiffness to the hull structure. It is also known to provide contourable blankets in which modules of rigid foam plastic material are mounted on an open-mesh scrim.

Marine structures which are submerged in water are subject to attack by marine organisms these organisms attach themselves and grow on the surface of the structure, thereby fouling this surface and accelerating corrosion of the structure. Such marine organism or biomass assume various forms depending on the nature of the seawater and environmental conditions, such as barnacles, slimes, tubeworms, sponges, anemones and mollusks.

The major impact of marine growth on ships is on operating efficiency, for even after a single year of growth, there can be as much as a 30 percent increase in resistance to movement of the vessel. If fouling of the hull is not prevented, marine organisms will continue to attach themselves, giving rise to ever increasing operating costs associated with additional fuel requirements and decreased speed. This is true not only of relatively large ships, but also of pleasure and sports boats.

One can remove marine organisms from a boat or ships by scraping the organisms off the hull or by using rotary brushes for this purpose. But to do so, the boat must be put in dry dock and put out of commission.

A common method of overcoming fouling which does not require putting the boat in dry dock is to use highly toxic paints on the hull, such as compounds of copper or mercury that are soluble in seawater and retard the build-up of marine growth. However the leaching of these toxic materials into harbors and other waters presents an environmental hazard.

Another known anti-fouling method is to coat the hull of a boat with a metallic paint whose ions are toxic to marine life, such as copper, silver or tin, and to then periodically apply a voltage to the hull to anodically dissolve the toxic ions into seawater and thereby inhibit marine life growth. This method is disclosed in U.S. Pat. Nos. 3,611,742 and 3,497,434. The use of a copper anti-fouling mesh to poison marine growth is disclosed in U.S. Pat. No. 4,375,199.

But antifouling systems which depend on dissolving toxic substances into seawater have limited utility, for the coating applied to the hull becomes depleted and the hull must be repainted periodically.

Of greatest prior art interest is the Riffe U.S. Pat. No. 5,346,598 entitled "Method For The Prevention Of Fouling And/Or Corrosion Of Structures In Seawater, Brackish Water And/Or Fresh Water."

Riffe discloses a hull which is coated with an electrically-conductive zinc paint. Mounted within the hull are titanium electrodes. And applied between the titanium electrodes and the electrode formed by the conductive zinc coating is a battery voltage to establish an electric field between the electrodes. The polarity of the voltage on the zinc electrode is negative. Riffe points out that the reason this arrangement discourages the growth of fouling organisms is that their bacterial cells posses a negative surface charge which when placed in an electrical field causes them to migrate away from the negative end of this field. (See Riffe, Column 10, lines 26 et al.).

SUMMARY OF INVENTION

In view of the foregoing, the main object of this invention is to provide a structural laminate for forming a hull or other marine structure in which the laminate, when electrically activated, is rendered resistant to fouling by marine organisms.

More particularly an object of the invention is to provide a structural laminate of the above type having embedded therein an electrical grid defining an anodic electrode, the outer surface of the laminate being coated with a conductive paint defining a cathodic electrode.

A significant feature of an anti-fouling laminate in accordance with the invention is that the core of the laminate is formed by balsa wood or foam plastic modules mounted on an open-mesh fabric scrim whereby the core acts as a contourable blanket that can be conformed to the curvature of the hull or other marine structure; the mesh including conductive fibers to create an electrical grid.

Also an object of this invention is to provide a contourable core blanket of the above type in which margins of the open-mesh scrim extend beyond the balsa wood of foam-plastic modules mounted thereon whereby when several blankets are combined to conform to a hull, the margins overlaps the scrim on the adjacent blanket to electrically connect these scrims. Hence the scrims on the blankets which combine to form the hull form an electrical grid co-extensive with the hull.

Briefly stated, these objects are attained in a marine structure submersible in seawater, such as a hull, which when electrically activated is then resistant to fouling by marine organisms. The hull is formed by a structural laminate having a core sandwiched between inner and outer skins. The outer skin which forms the exposed surface of the hull is coated with a metallic paint defining a cathodic electrode. The core is constituted by balsa wood or foam plastic modules attached to an open-mesh scrim that includes conductive fibers to create an electrical grid defining an anodic electrode that is embedded in the laminate. Impressed across the electrodes is a direct voltage to establish an electric field causing marine organisms which seek to foul the hull surface to migrate away from this surface. Alternatively, the cathodic electrode may be formed by an open mesh scrim defining an electrical grid interposed between the core and outer skin.

BRIEF DESCRIPTION OF DRAWING

For a better understanding of the invention as well as other objects and further features thereof, reference is made to the following detailed description to be read in conjunction with the accompanying drawings, wherein:

FIG. 1 is a perspective view of a contourable balsa wood blanket in accordance with the invention;

FIG. 2 shows a portion of the open mesh scrim included in the blanket;

FIG. 3 illustrates two blankets in abutting relation in which a margin on the scrim of one blanket overlaps the scrim of the other blanket;

FIG. 4 shows a portion of a laminated boat hull formed by the blankets;

DESCRIPTION OF INVENTION

First Embodiment

Figure 6:
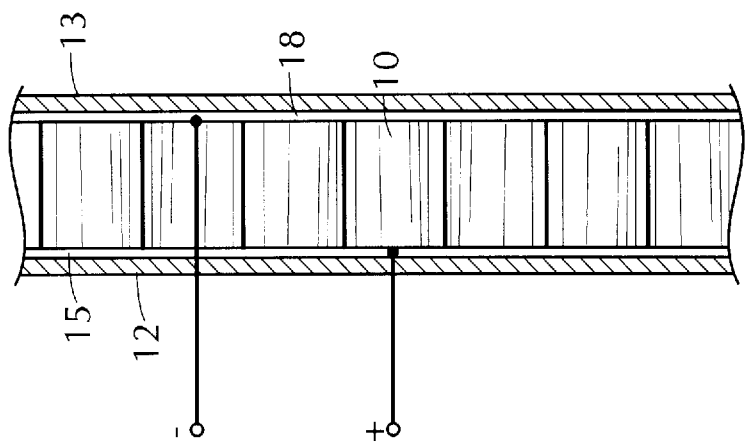
FIG. 6 shows an alternative embodiment of the invention.

Referring now to FIG. 1, there is shown a contourable core in accordance with the invention, generally designated by numeral 10, core 10 being designed for inclusion in a contoured marine laminate, such as the hull shown in FIG. 4. In this laminate, core 10 which follows the contours of the hull, is sandwiched between facing skins 12 and 13 and is bonded thereto, outer skin 13 being the exposed surface of the hull which is submerged in seawater.

Core 10 is constituted by a planar array of individual block-like modules 14, preferably made of end-grain balsa wood, whose fibers are generally normal to the opposing faces of the core. In practice, instead of balsa, the modules may be made of synthetic foam-plastic material, such as urethane. In both cases, the core is light weight and sandwiched between fiber reinforced facing skins.

Modules 14 are held together in edge-to-edge relation by an open mesh fabric scrim 15 to which the modules are adhesively attached. Fabric scrim 15, shown separately in FIG. 2, is composed of longitudinally extending warp fibers Fa intersected by transverse weft fibers Fb. Warp fibers Fa are composed of non-conductive fibers of high tensile strength, such as polyethylene or fiberglass filaments, which alternate with electrically-conductive fibers $Fa^1$ of copper, carbon or other conductive filamentary material.

Weft fibers Fb are likewise composed of non-conductive filaments of high tensile strength which alternate with electrically-conductive fibers $Fa^1$. The conductive filaments $Fa^1$ in the warp intersect and connect with the conductive filaments $Fa^1$ in the weft to create an electrical grid defining an anodic electrode whose purpose will later be explained.

The rectangular dimensions of scrim 15 are somewhat greater than that of the array of modules 14 attached to the scrim to form a longitudinal margin $M_1$ extending beyond the long side of the core and a transverse margin $M_2$ extending beyond the short side of the core.

In practice, instead of overlapping the scrims of adjacent cores, a metal foil strip extending across the scrims of all of the cores forming the laminated hull may be used to interconnect these scrims so that together they create the electrical grid coextensive with the hull and defining the anodic electrode of the system.

In producing a hull, use is made of a hull-shaped mold in which is laid down a fiberglass mat, the mat being then wet coated for lamination to the scrim side of the contourable core blanket to form, when cured, the resin-impregnated inner skin of the laminate. To conform the blanket to the contours of the hull mold, a roller is used for this purpose which presses the blanket against the mold to the extent necessary to detach the modules from the scrim to conform to the hull contour. But the scrim conforms to the inner skin of the laminate and since the scrim is an electrical grid, the grid is embedded in the laminate.

Then when the contourable core is laminated to the inner skin of the laminate, a fiberglass mat is laid down on the outer face of the modules and is wet-coated to form, when the resin is cured, a resin-impregnated outer skin.

It takes several contourable core blankets 10 to cover the entire area of a typical hull. In order therefore to create from the scrims of these blankets an electrical grid co-extensive with the hull, as shown in FIG. 3, the scrim margin $M_1$ of core 10 is made to overlap the scrim on the adjacent core 10A so as to electrically interconnect the electrical grids of the adjacent cores.

As shown in FIG. 4, outer skin 13 of the laminate which forms the surface of the hull is immersed in seawater 16. This surface is coated with a metallic paint 17, such as a zinc or copper paint, to define a cathodic electrode.

Figure 5:
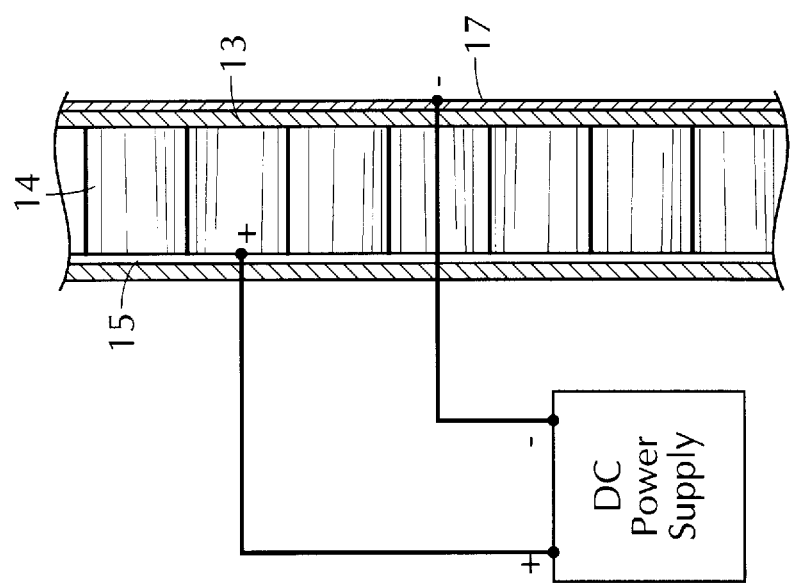
FIG. 5 illustrates how the laminated hull is electrically activated.

As shown in FIG. 5, disposed within the hull of the boat formed by a laminate in accordance with the invention is a D-C power supply 18 whose negative terminal is connected to the cathodic electrode 17 formed by the conductive metallic paint coating the hull surface. The positive terminal of D-C supply 18 is connected to the anodic electrode formed by the electrical grid of scrim 15.

Since the contourable core and the skins laminated thereto are formed of dielectric material, established between anodic electrode 15 embedded in the laminate and the cathodic electrode 17 painted on the outer surface of the laminate is an electric field which produces a negative charge on the surface of the hull. This charge repels the negatively-charged bacterial cells of marine organism which seek to attach themselves onto the hull surface, thereby causing these organisms to migrate away form the hull.

Hence while the hull laminate is electrically activated, it prevents marine organisms from attaching themselves to the hull and growing on the hull to foul and corrode its structure.

The D-C voltage may be kept on continuously, for the core of the hull laminate acts as the dielectric of a capacitor sandwiched between cathodic and anodic electrodes; hence little current is drawn by this capacitor.

In practice, the metallic coating on the surface of the hull may be coated with a non-conductive polymeric coating to prevent the corrosion of the metallic coating and the leaching of metal salts into the water.

Second Embodiment

In the first embodiment of a laminated hull structure in accordance with the invention, the anodic electrode is formed by a conductive open-mesh scrim 15 interposed between the inner skin 12 of the laminate and core 10, as shown in FIG. 5. The cathodic electrode in the first embodiment is formed by a layer 17 of conductive metal paint coated on outer skin 13.

In some instances, boat designers object to coating the surface of a hull with a metallic paint, for such paints which are usually black or red in color, are not acceptable to the designer or to his clients.

In order, therefore, to avoid the need to paint the hull with a conductive metal paint, yet provide the necessary cathodic electrode, in the laminated hull structure, then as shown in FIG. 6, a conductive open-mesh scrim 18 is interposed between the core 10 and the outer skin 13 of the hull, the laminate otherwise being the same as in FIG. 5. Then by applying a D-C potential between the anodic scrim 15 and the cathodic scrim 18 between which core 10 is sandwiched, an electrostatic field is created whose negative charge is on the outer skin 13 forming the surface of the hull. Since skin 13 is of fiberglass-reinforced resin, it is dielectric in nature and acts to sustain the negative charge and repel microorganisms seeking to foul the hull.

While there has been shown preferred embodiments of an anti-fouling laminated marine structure in accordance with the invention, it is to be understood that many changes may be made therein without departing from the spirit of the invention.

I claim:

1. A laminated marine structure, such as a hull, which when submerged in seawater is resistant to fouling by marine organisms, said structure comprising:
    A. a contourable core of insulation material adapted to conform to the contours of the hull, said core being attached on one side to an open-mesh fabric scrim that includes conductive fibers whereby the scrim functions as an electric grid defining an anodic electrode;
    B. an inner skin laminated to the scrim side of the core;
    C. an outer skin laminated to the other side of the core to form the surface of the hull;
    D. means adjacent the outer skin to define a cathodic electrode; and
    E. means to apply a direct voltage between said cathodic electrode and said anodic electrode to create an electric field therebetween producing a negative charge on the cathodic electrode which repels negatively-charged marine organisms to prevent their growth on the surface of the hull.

2. A marine structure as set forth in claim 1, in which the means defining the cathodic electrode is constituted by an electrically conductive open-mesh scrim interposed between the outer skin and the core.

3. A marine structure as set forth in claim 1, in which the means defining the cathodic electrode is constituted by a layer of metallic paint coated on the outer skin.

4. A marine structure as set forth in claim 3, on which the layer contains zinc.

5. A marine structure as set forth in claim 1, in which the core is composed of a rectangular array of balsa wood modules in edge-to-edge relation attached to said scrim.

6. A marine structure as set forth in claim 5, in which the non-conductive fibers are fiberglass.

7. A marine structure as set forth in claim 1, in which the core is composed of a rectangular array of foam-plastic modules in edge-to-edge relation attached to said scrim.

8. A marine structure as set forth in claims 5 or 7 in which the scrim has larger rectangular dimensions than the array to provide a margin extending beyond the array whereby when two cores are placed in abutting relation, the margin on the scrim of one core then overlaps the scrim of the other core.

9. A marine structure as set forth in claim 1, in which the scrim includes non-conductive fibers which alternate with the conductive fibers.

10. A marine structure as set forth in claim 1, in which the inner and outer skins are each formed of fiberglass-reinforced resin.

11. A marine structure as set forth in claim 1, in which the conductive fibers in the scrim are carbon fibers.

* * * * *